US010069626B2

United States Patent
Riel

(10) Patent No.: US 10,069,626 B2
(45) Date of Patent: Sep. 4, 2018

(54) MULTIPLE ENCRYPTION KEYS FOR A VIRTUAL MACHINE

(71) Applicant: Red Hat, Inc., Raleigh, NC (US)

(72) Inventor: Henri Van Riel, Concord, NH (US)

(*) Notice: Subject to any disclaimer, the term of this patent is extended or adjusted under 35 U.S.C. 154(b) by 116 days.

(21) Appl. No.: 15/051,505

(22) Filed: Feb. 23, 2016

(65) Prior Publication Data

US 2017/0244557 A1 Aug. 24, 2017

(51) Int. Cl.
*H04L 9/08* (2006.01)
*G06F 9/455* (2018.01)

(52) U.S. Cl.
CPC ........ *H04L 9/0838* (2013.01); *G06F 9/45558* (2013.01); *G06F 2009/45587* (2013.01)

(58) Field of Classification Search
CPC ....................................... H04L 9/838
USPC ....................................... 713/171
See application file for complete search history.

(56) References Cited

U.S. PATENT DOCUMENTS

| 8,032,741 | B2 | 10/2011 | Smith |
| 8,639,949 | B2 | 1/2014 | Van Rijnswou |
| 8,694,786 | B2 | 4/2014 | Augu et al. |
| 8,856,504 | B2 | 8/2014 | Maino et al. |
| 8,990,582 | B2 | 3/2015 | Maino et al. |
| 9,009,471 | B2 | 4/2015 | Korthny |
| 2012/0216052 | A1* | 8/2012 | Dunn ...................... G06F 21/78 713/193 |
| 2014/0281560 | A1 | 9/2014 | Ignatchenko et al. |
| 2016/0140343 | A1* | 5/2016 | Novak .................. G06F 21/575 713/2 |

OTHER PUBLICATIONS

Leendert van Doorn, "Secure Systems Design", Corporate Fellow and corporate VP, AMD, Pub. Aug. 10, 2014, 31 pgs.
Ronald Perez et al, Virtualization and hardware-Based Security, IBM Research Div, Thomas J. Watson Research Center, Jun. 23, 2008, 9 pgs.
"vCage Features and Benefits", 2014, https://privatecore.com/vcage/vcage-features-benefits/, 2 pgs.

* cited by examiner

Primary Examiner — Jacob Lipman
(74) Attorney, Agent, or Firm — Haynes and Boone LLP

(57) ABSTRACT

A method includes, with a computing system, exiting a context of a virtual machine, the exiting in response to a request from a guest operating system of the virtual machine to switch from a first encryption key identifier for the virtual machine to a second encryption key identifier for the virtual machine. The method further includes, with the computing system, loading the second encryption key identifier into a virtual machine control module of a virtual processor of the virtual machine and after loading the second encryption key identifier, entering the context of the virtual machine.

19 Claims, 4 Drawing Sheets

MULTIPLE ENCRYPTION KEYS FOR A VIRTUAL MACHINE

BACKGROUND

The present disclosure relates generally to virtual computing systems, and more particularly, encryption mechanisms used by virtual computing systems.

A host machine (e.g., computer or server) is a computing system that is typically enabled to simultaneously run one or more virtual machines, where each virtual machine may be used by a local or remote client. The host machine allocates a certain amount of execution time from the host's physical processors to each of the virtual machines. Each virtual machine may use the allocated resources to execute applications, including operating systems known as guest operating systems.

A virtual machine is a piece of software that, when executed on appropriate hardware, creates an environment allowing the virtualization of an actual physical computer system. Each virtual machine running on the physical system may function as a self-contained platform, running its own operating system (OS) and software applications (processes) on one or more virtual processors.

Various computing systems use encryption technology that encrypts data to be stored in memory. Such encryption may be selectively applied to specific portions of memory, as specified by the operating system. Thus, even if that memory is compromised, it is incomprehensible without the corresponding encryption key used to encrypt it. Virtual machines that run on a single host machine typically store data on the same physical media that is used by other virtual machines running on the host machine.

SUMMARY

According to one example, a method includes, with a computing system, exiting a context of a virtual machine, the exiting in response to a request from a guest operating system of the virtual machine to switch from a first encryption key identifier for the virtual machine to a second encryption key identifier for the virtual machine. The method further includes, with the computing system, loading the second encryption key identifier into a virtual machine control module of a virtual processor of the virtual machine and after loading the second encryption key identifier, entering the context of the virtual machine.

According to one example, a method includes, with a guest operating system, switching from a first application of a first application set to a second application of a second application set, the first application set being associated with a first encryption key identifier and the second application set being associated with a second encryption key identifier, with the guest operating system, sending a request to a hypervisor managing a virtual machine that supports the guest operating system, the request being to switch from the first encryption key identifier to the second encryption key identifier, and with the guest operating system, after receiving notification the second encryption key identifier has been loaded, executing the second application.

According to one example, a method includes, with a hypervisor, receiving a request from a guest operating system of the virtual machine supported by the hypervisor, the request being to switch an encryption key identifier in a virtual machine control module for the machine from a first encryption key identifier to a second encryption key identifier, with the hypervisor, switching the encryption key identifier in the virtual machine control module from the first encryption key identifier to the second encryption key identifier, both the first encryption can identifier and the second encryption key identifier being valid for the virtual machine, and causing the host computing system that supports the virtual machine to enter a context of the virtual machine.

Figure 1:
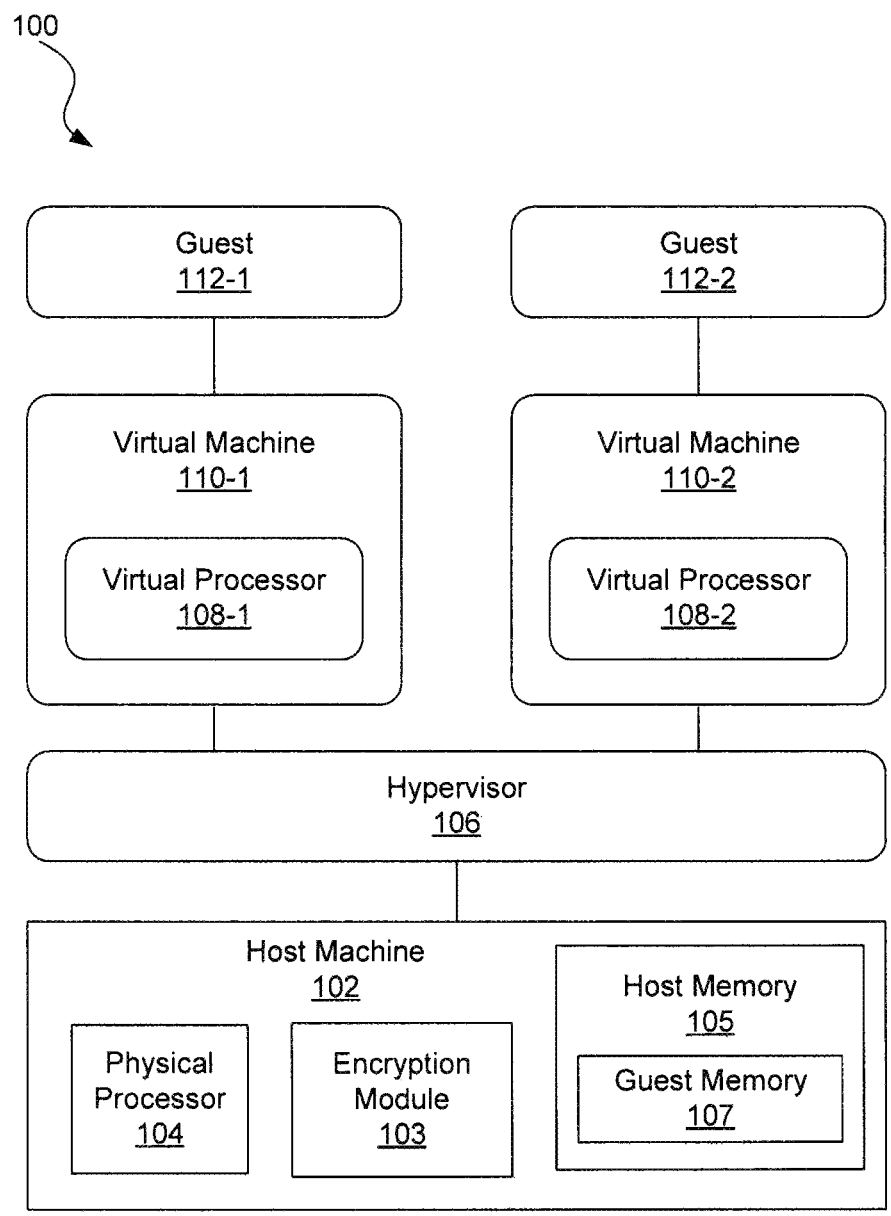
FIG. 1 is a diagram showing an illustrative host system running a plurality of virtual machines, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, virtual machines that run on a single host machine typically store data on the same physical media that is used by other virtual machines running on the host machine. For security purposes, it may be desirable that data from one virtual machine be encrypted with a different encryption key than data from other virtual machines. Thus, in some cases, the hardware of the host machine may support encrypting data for different virtual machines in different manners. In one example, data encryption involves an encryption module that creates encryption keys. The encryption module may be a standalone piece of hardware that provides encryption key identifiers that identify encryption keys without providing access to the encryption keys to any other hardware. When applications write data to memory, that data may be transparently encrypted by the security module using a particular encryption key. Similarly, when data is read from memory, the encryption module can transparently decrypt that data before providing it to the application requesting it.

Some pieces of hardware may include features that allow for the creation of multiple encryption keys so that a single encryption key may be associated with a single virtual processor of a virtual machine. A particular encryption key identifier for a particular virtual machine can be loaded into a virtual machine control module for that virtual processor. Thus, when the virtual processor of that virtual machine causes data to be written to memory, the data will be encrypted by the security module using the encryption key associated with the encryption key identifier within the virtual machine control module.

In some cases, however, it may be desirable for a single virtual machine to encrypt data differently for different sets of applications. According to principles described herein, a hypervisor may obtain multiple encryption key identifiers that can be used by a single virtual machine. These encryption key identifiers may then be used by the guest operating system for different sets of applications. In one example, when the guest operating system switches from a first application associated with a first encryption key identifier to a second application associated with a second encryption key identifier, the guest can instruct the hypervisor to switch from using the first encryption key identifier to using the second encryption key identifier.

In one example, to switch to using a different encryption key identifier, the host processor exits the context of the virtual machine and enters the contexts of the hypervisor. The hypervisor can then load new encryption key identifier into a virtual machine control module for a virtual processor of the virtual machine. The virtual machine control module may be a set of data that represents the status of a virtual processor for that virtual machine. After the new encryption key identifiers loaded into the virtual machine control module, the host processor can reenter the context of the virtual machine. Execution of the second application may then continue as normal.

FIG. 1 is a diagram showing an illustrative system 100 involving a plurality of virtual machines 110. According to the present example, a physical system, such as a host machine 102 includes hardware such as a processor 104, host memory 105, and an encryption module 103. The system 100 also includes a hypervisor 106. The hypervisor 106 supports a first virtual machine 110-1 and a second virtual machine 110-2. Although two virtual machines 110 are illustrated, other examples including fewer than two virtual machines or more than two virtual machines are within the scope of the present disclosure. The virtual machines provide the guest operating systems 112 with a virtual platform on which to operate. Each virtual machine 110 may include one or more virtual processors 108. As will be explained in further detail below, each virtual processor has its own virtual machine control module. Thus, each virtual processor may use a different encryption key identifier.

The hypervisor 106 allows for multiple virtual machines 110, and thus multiple guests 112, to run on the same physical host machine 102. Additionally, the host machine 102 may run the multiple guests 112 concurrently and in isolation from other programs on the host machine 102. One guest 112-1 may run different type of operating system than another guest 112-2 being run on the same host machine 102. Additionally, the operating system associated with a guest 112 running on a virtual machine 110 may be different from the host operating system running on the host machine 102.

A guest 112 may include anything executed on a virtual machine 110-1. For example, a guest 112 may include an operating system, applications running on that operating system, data storage associated with the applications and operating system, drivers, etc. In one example, a guest 112-1 may be packaged as a large set of data that is loaded into host memory 105. The hypervisor 106 then interacts with that large set of data to execute instructions on one of the virtual machines 110. A guest operating system 112 provides various applications with access to the virtual resources (i.e., a virtual processor 108) of a virtual machine 110. The hypervisor then maps the virtual resources to the underlying physical resources (i.e., physical processor 104 and guest memory 107) of the host machine 102.

The host memory 105 refers to the working memory of the host system. Working memory is typically Random Access Memory (RAM) and is designed for speed. Working memory is often a volatile form of memory, meaning that it loses its data when power is no longer supplied. The host system 102 may, however, have other forms of memory available such as solid state drives, Network-Attached Storage (NAS) drives, Redundant Array of Independent Disks (RAID) drives, and other non-volatile storage devices. The various types of memory may store information in the form of software and data. The host memory 105 may designate various blocks of memory for use by the hypervisor 106 or for use by the guests 112 using the virtual machines 110. These blocks of memory may be ranges of physical memory addresses or virtual memory addresses.

A certain portion of the host memory 105 is dedicated to guest memory 107. The total guest memory 107 may be made available for multiple guests 112 to use. As described above, the guest memory may be divided into different regions or modules, each module associated with a different virtual machine.

The encryption module 102 is used to transparently encrypt data that is stored to memory. In one example, the encryption module creates an encryption key, but maintains that encryption key without allowing other pieces of hardware access to that encryption key. Instead, the encryption module 103 provides an encryption key identifier to the host machine 102. When the host machine wishes to encrypt data, it uses the encryption key identifier to indicate to the encryption module 103 what encryption key should be used. In some cases, a flag within a page table may be used to determine whether a page of memory should be encrypted or not.

As described above, the encryption module 103 may create multiple encryption keys and provide the corresponding encryption key identifiers to the host machine 102 for use with different virtual machines. When the host machine enters the context of a particular virtual machine, it loads the encryption key identifier for that virtual machine into a virtual machine control module. The virtual machine control module maintains data regarding the status and other information about the virtual processor. One example of a virtual machine control module is a Virtual Machine Control Block (VMCB) that is used in processors made by Advanced Micro Devices, Inc. Another example is a Virtual Machine Control Structure (VMCS) that is used in processors made by Intel. With the encryption key identifier loaded, when the virtual processor executes instructions that involve storing data to memory, the virtual processor provides the encryption key identifier to the encryption module 103, which then encrypts the data using the corresponding encryption key. As will be explained in further detail below, to allow a virtual machine to use multiple encryption keys, the guest operating system can cause the host system to exit the context of the virtual machine, exchange encryption key identifiers for a specific virtual processor, and reenter the context of the virtual machine when the guest operating system desires to use a different encryption key.

In the example illustrated in FIG. 1, virtual machines 110 are platforms on which the guests 112 run. The virtual machines 110 include virtual processors 108 which are designed to appear to the guests 112 as physical processors. The hypervisor 106 manages the host machine 102 resources and makes them available to one or more guests 112 that alternately execute on the same hardware. The hypervisor 106 manages hardware resources and arbitrates requests of the multiple guests. In an example, the hypervisor 106 presents a virtual machine that includes a virtual set of Central Processing Unit (CPU), memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

The hypervisor 106 can map a virtual resource or state (e.g., registers, memory, or files) to real resources in the underlying host machine 102. For example, the hypervisor 106 may present a guest memory to guest 112-1. The hypervisor 106 may map the memory locations of guest memory to physical memory locations of memory 105.

To facilitate multiple virtual machines 110 simultaneously, hardware resources are shared among the hypervisor 106 and one or more guests 112. The physical processors 104 of the host machines enter and exit the context of different virtual processors 108 and the hypervisor 106. A virtual machine exit marks the point at which a context switch occurs between the virtual processor 108 currently running and the hypervisor 106, which takes over control for a particular reason. During the context switch, the processor 104 may save a snapshot of the state of the virtual processor that was running at the time of exit. The virtual machine exit is handled by the hypervisor 106, which decides the appropriate action to take and then transfers control back to the virtual processor 108 via a virtual machine entry. A virtual machine entry marks the point at which a context switch occurs between the hypervisor 106 and a virtual processor 108, which takes over control.

Figure 2:
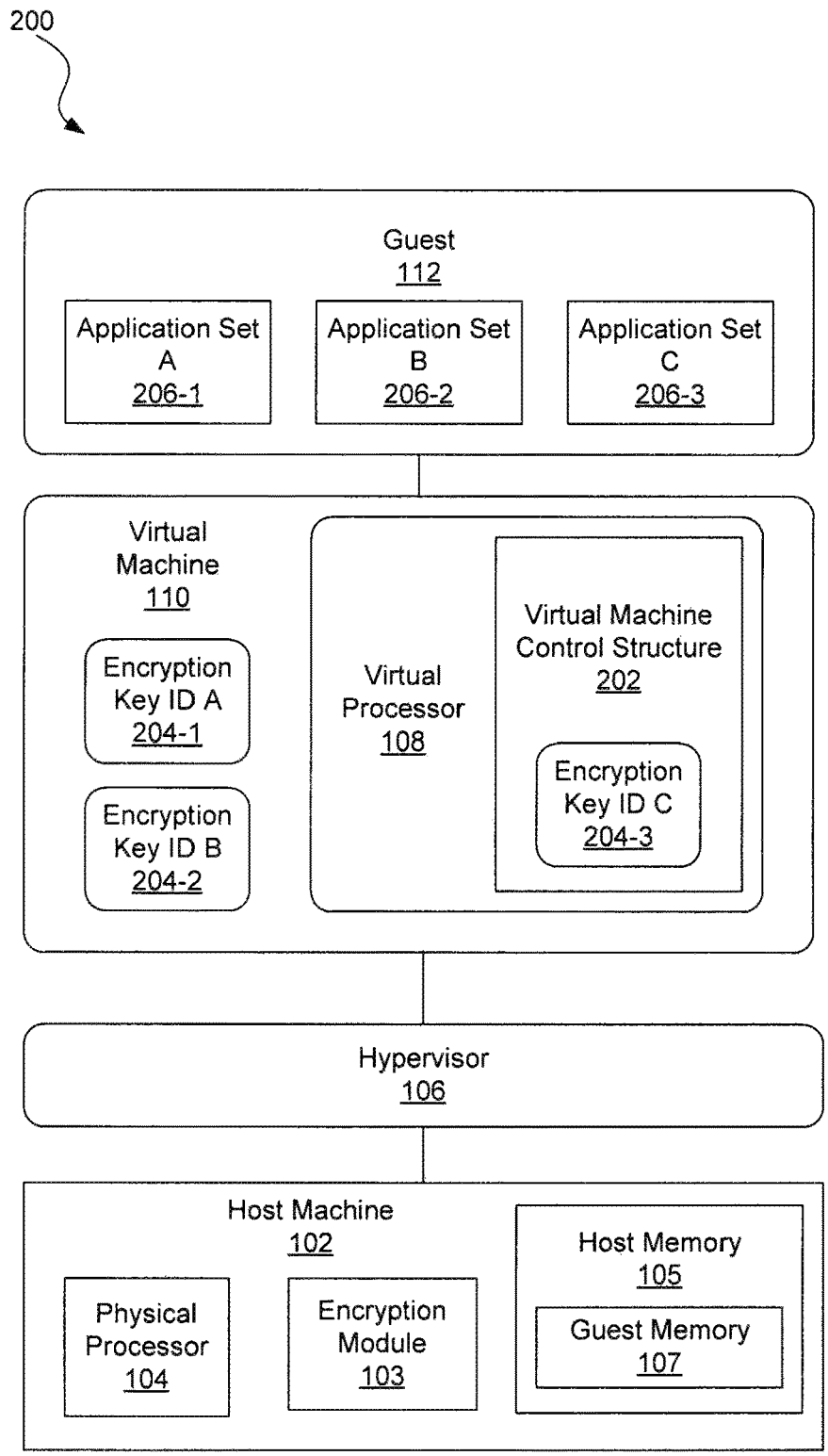
FIG. 2 is a diagram showing multiple encryption key identifiers for a single virtual machine, according to one example of principles described herein.

FIG. 2 is a diagram showing multiple encryption key identifiers for a single virtual machine. According to the present example, the guest operating system 112 supports a number of applications that are divided into sets 206. Each one of these sets 206 is associated with its own encryption key identifier 204. Encryption key identifiers 204 may be maintained by the hypervisor 106 in association with the virtual machine 110.

Applications may be grouped into sets in a variety of manners. In one example, a set may include a plurality of applications. The plurality of applications may be grouped into a set based on a common feature of the plurality of applications, such as the purpose of the applications, operating entity of the applications, or other feature. In some examples, a set may include a single application. In some examples, a set may correspond to a nested virtual machine. In other words, a set may include a hypervisor application that supports one or more nested virtual machines.

In the present example, the sets include Application Set A 206-1, Application Set B 206-2, and Application Set C 206-3. Application Set A 206-1 corresponds to encryption key identifier A 204-1, Application Set B 206-2 corresponds to encryption key identifier A 204-2, and Application Set C 206-3 corresponds to encryption key identifier C 204-3. In the present example, encryption key identifier C 204-3 is currently loaded into the virtual machine control module 202. Thus, as applications within Application Set C 206-3 write data to memory, that memory is transparently encrypted by the encryption module (e.g., 103, FIG. 1) using the encryption key associated with encryption key identifier C 204-3.

As mentioned above, the virtual machine control module includes data related to the status and nature of the virtual processor. For example, the virtual machine control module may include bits that specify conditions under which the host will exit to the hypervisor. Such conditions may include reads or writes to control registers, specific exceptions, or I/O opertions. The virtual machine control module also includes the encryption key identifier to be used when encrypting data. In some examples, the virtual machine control module may only use one encryption key identifier at a time.

When the guest operating system 112 switches to an application from a different application set 206 than the current application, or it is otherwise desirable to switch encryption key identifiers 204, the guest operating system 112 can cause the encryption key identifier 204 within the virtual machine control module 202 to be switched. For example, if the guest 112 intends to switch to an application within Application Set B 206-2, and it is determined that the encryption key identifier 204 associated with application is different than the encryption key identifier 204 associated with Application Set C, then the guest operating system 112 will cause the encryption key identifiers 204 to be switched. As will be explained in further detail below, this involves exiting the context of the virtual machine 110 and entering the context of the hypervisor 106. The hypervisor 106 can then switch out the encryption keys as requested and reenter the context of the virtual machine 110.

While the present example illustrates a single virtual processor 108, some examples may include multiple virtual processors, each virtual processor having its own virtual machine control module. Additionally, each of the multiple virtual processors may have a different encryption key identifier loaded into its virtual machine control module. In some examples, the guest operating system can process different applications on different virtual processors using different virtual encryption key identifiers. Thus, different encryption key identifiers can be available for use at the same time. For example, the guest 112 may process an application within Application Set A 206-1 on a first virtual processor having Encryption Key Identifier A 204-1 loaded in its virtual machine control module. Additionally, the guest may process an application within Application Set B 206-2 on a virtual processor having Encryption Key Identifier B 204-2 loaded in its virtual machine control module.

Figure 3:
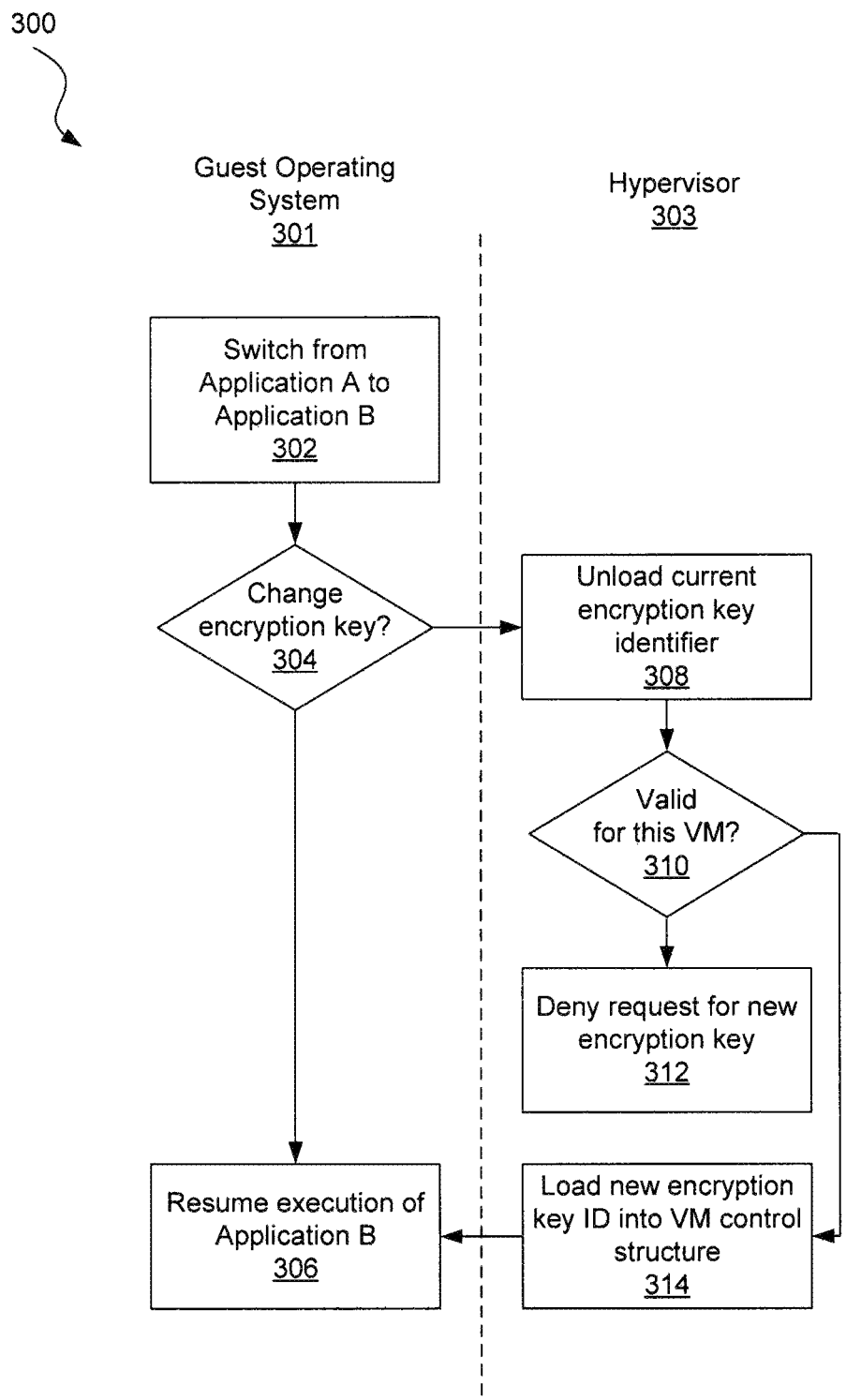
FIG. 3 is a flowchart showing illustrative method for switching encryption key identifiers for a single virtual machine, according to one example of principles described herein.

FIG. 3 is a flowchart showing illustrative method for switching encryption key identifiers for a single virtual machine. According to the present example, the method 300 starts at step 302, in which the guest operating system 301 switches from Application A to Application B. As described above, the guest operating system 301 provides various applications with access to the virtual hardware of the virtual machine. The guest operating system 301 may support multiple processes, each process associated with a different application. Additionally, different applications may be associated with different encryption key identifiers.

At step 304, the guest operating system 301 determines whether different encryption key is to be used for Application B. If not, the method 300 proceeds to step 306, at which execution of Application B is resumed. For example, it may be the case that Application B uses the same encryption key identifier as Application A. In some cases, it may be the case that Application B does not use encryption, and thus does not use an encryption key identifier. In such a case, execution of Application B may continue without exchanging encryption key identifiers.

If, however, it is determined that a different encryption key identifier should be used, then the method proceeds to step 308. A different encryption key identifier should be used if Application B is associated with a different encryption key identifier than Application A. For example, Application A may be part of a first set associated with a first encryption key identifier and Application B may be part of the second set associated with the second encryption key identifier. In such case, the encryption key identifier within the virtual machine control module should be changed from the first encryption key identifier to the second encryption key identifier.

In one example, determining whether a different encryption key should be used may be performed when the guest operating system 301 switches to a different application. The guest operating system 301 may determine whether a different encryption key should be used by comparing the encryption key identifier that is currently loaded into the virtual machine control module (e.g., 202, FIG. 2) with the encryption key identifier associated with the application to which the guest operating system 301 is switching. If the two encryption key identifiers are the same, then no switch may be performed. If the two encryption key identifiers are different, then it can be determined that the encryption key identifier should be changed. Specifically, the encryption key identifier within the virtual machine control module should be changed to the encryption key identifier associated with Application B.

To change encryption key identifiers, the host system sends to the hypervisor a request to switch to the encryption key identifier associated with Application B. The request causes the host system to exit the context of the virtual machine that supports the guest operating system 301. The host system then enters the context of the hypervisor 303. In one example, the request may be part of a hypercall.

According to the present example, with the processor in the context of the hypervisor 303, the hypervisor 303 unloads the current encryption key identifier from the virtual machine control module at step 308. Thus, the new encryption key identifier is able to be loaded. Before loading the new encryption key identifier, the hypervisor 303 determines if the new encryption key identifier is a valid identifier for the virtual machine supporting the guest operating system 301 at step 310.

As will be described in further detail below, the hypervisor 303 may maintain a table of encryption key identifiers that have been provided to various virtual machines. Thus, the hypervisor 303 can make sure that a particular encryption key identifier is actually associated with the virtual machine sending the request. This prevents the scenario in which a maliciously obtained encryption key identifier is obtained by an application running on a guest operating system associated with a different virtual machine attempts to access data to which it should not have access.

If it is determined that the encryption key identifier is not valid for the virtual machine associated with the guest operating system 301, then the request is denied at step 312. If, however, the encryption key identifier is indeed valid for the virtual machine, then the hypervisor 303 can execute the request. Specifically, at step 314, the new encryption key identifier is loaded into the virtual machine control module 314. After the new encryption key identifier has been loaded into the virtual machine control module, the host system can reenter the context of the virtual machine. With the new encryption key identifier in place, the guest operating system can allow Application B to resume execution. Data written to memory by Application B can then be encrypted by the encryption module using the appropriate encryption key identifier.

Figure 4:
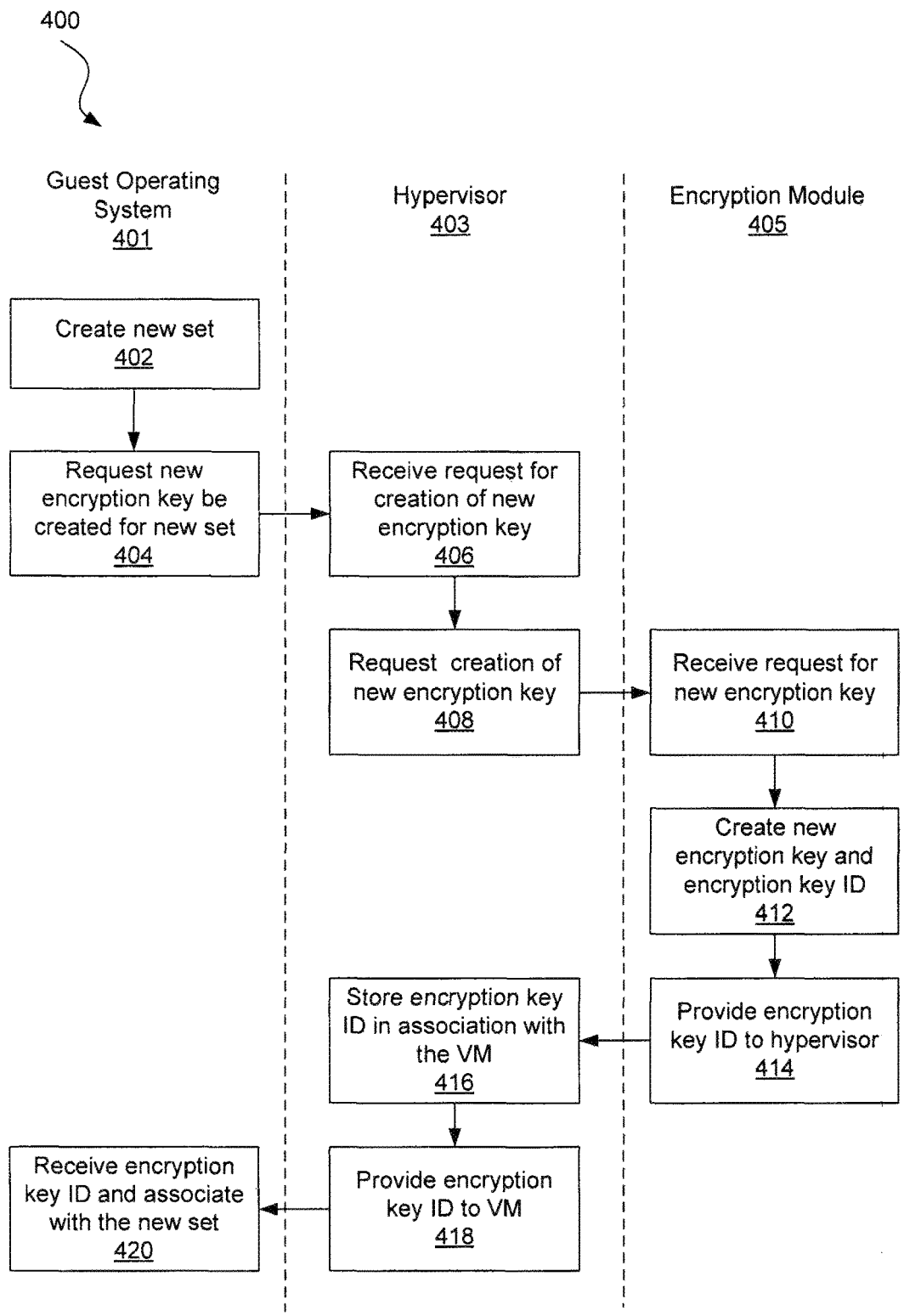
FIG. 4 is a diagram showing an illustrative method for obtaining new encryption key identifiers for single virtual machine, according to one example of principles described herein.

FIG. 4 is a diagram showing an illustrative method for obtaining new encryption key identifiers for single virtual machine. According to the present example, steps are performed by a guest operating system 401, a hypervisor 403, and an encryption module 405. The method 400 starts when the guest operating system creates a set at step 402. As described above, the set 402 may correspond to a single application, a plurality of applications, or a nested virtual machine.

At step 404, the guest operating system 404 requests a new encryption key for the new set. At step 406, the hypervisor 403 receives the request from the new encryption key. At step 408, the hypervisor then sends a request for a new encryption key to the encryption module 405. At step 410, the encryption module 405 receives the request for the new encryption key.

At step 412, the encryption module 405 creates the new encryption key as requested. The encryption key may be a symmetric encryption key. The encryption key may be a data value that when combined with a piece of data, changes that data in a reversible manner. Only by combining the changed data with the encryption key can the original data be retrieved. To keep the encryption key secure from other programs that may wish to obtain unauthorized access to an encryption key, the encryption module 405 maintains the encryption key itself. The security module 405 does not allow access to its stored data to other pieces of hardware such as the main processors of the host system.

At step 414, the encryption module provides an encryption key identifier associated with the newly created encryption key to the hypervisor 403. The encryption key identifier is used by the encryption module to identify a particular encryption key to be used to encrypt or decrypt data. The hypervisor then receives the encryption key identifier from the encryption module.

At step 416, the hypervisor 403 stores the encryption key identifier in association with the virtual machine that requested that the encryption key be created. Because the hypervisor 403 may manage multiple virtual machines, it stores the encryption key identifiers in association with their respective virtual machines so that it can determine whether a particular encryption key identifier is valid for the virtual machine that requests use of such an encryption key identifier.

At step 418, the hypervisor 418 provides the received encryption key identifier to the guest operating system 401. The guest operating system 401 then receives the encryption key identifier and associates the new encryption key identifier with the newly created set at step 420. Thus, when the guest operating system switches to an application associated with the new set, it can determine whether the encryption key identifier within the virtual machine control module should be changed.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
with a computing system, exiting a context of a virtual machine, the exiting in response to a request to switch from a first encryption key identifier for the virtual machine to a second encryption key identifier for the virtual machine;
with the computing system, loading the second encryption key identifier into a virtual machine control module associated with the virtual machine; and
with the computing system, after loading the second encryption key identifier, entering the context of the virtual machine.

2. The method of claim 1, wherein the loading is in response to determining that the second encryption key identifier is valid for the virtual machine.

3. The method of claim 1, further comprising, denying the request in response to determining that second encryption key identifier is not valid for the virtual machine.

4. The method of claim 1, further comprising, with the computing system, associating a virtual processor of the virtual machine with an encryption key identifier, and only running applications associated with the encryption key identifier on the virtual processor.

5. The method of claim 1, further comprising:
with a guest operating system of the virtual machine, switching from a first application to a second application; and
in response to determining that there is no encryption key identifier associated with the second application, maintaining within a virtual machine control module, an encryption key associated with the first application.

6. The method of claim 1, wherein the first encryption key identifier is associated with a first application set and the second encryption key identifier is associated with a second application set, the request being in response to the virtual machine switching from an application from the first application set to an application from the second application set.

7. The method of claim 6, wherein the first application set comprises a nested virtual machine.

8. The method of claim 1, further comprising, to create a new application set, with a guest operating system of the virtual machine, requesting a new encryption key identifier for the new application set.

9. The method of claim 8, wherein the requesting is made to an encryption module of the computing system, the encryption module configured to maintain encryption keys associated with encryption key identifiers.

10. The method of claim 9, further comprising receiving the new encryption key identifier from the encryption module and providing the new encryption key identifier to the guest operating system.

11. A method comprising,
with a guest operating system, switching from a first application of a first application set to a second application of a second application set, the first application set being associated with a first encryption key identifier and the second application set being associated with a second encryption key identifier;
with the guest operating system, sending a request to a hypervisor managing a virtual machine that supports the guest operating system, the request being to switch from the first encryption key identifier to the second encryption key identifier for a virtual processor;
with a computing system that supports the virtual machine, exiting a context of the virtual machine and entering a context of the hypervisor in response to the request; and
with the guest operating system, after receiving notification that the second encryption key identifier has been loaded, executing the second application.

12. The method of claim 1, further comprising, with the computing system, verifying that the second encryption key identifier is valid for the virtual machine.

13. The method of claim 12, further comprising, with the computing system, replacing the first encryption key identifier with the second encryption key identifier within a virtual machine control module of the virtual processor.

14. The method of claim 13, further comprising, with the computing system, reentering the context of the virtual machine.

15. The method of claim 11, further comprising, with the hypervisor:
receiving a request from the guest operating system for a new encryption key identifier;
instructing an encryption module to generate a new encryption key identifier;
receiving the new encryption key identifier from the encryption module; and
storing the new encryption key identifier such that the new encryption key identifiers associated with the guest operating system.

16. The method of claim 15, further comprising, with the hypervisor, providing the new encryption key identifier to the guest operating system.

17. A method comprising:
with a hypervisor, receiving a request from a guest operating system of the virtual machine supported by the hypervisor, the request being to switch an encryption key identifier in a virtual machine control module for the machine from a first encryption key identifier to a second encryption key identifier;
with the hypervisor, after a context switch from the guest operating system to the hypervisor, switching the encryption key identifier in the virtual machine control module of a virtual processor from the first encryption key identifier to the second encryption key identifier, both the first encryption key identifier and the second encryption key identifier being valid for the virtual machine; and
causing the host computing system that supports the virtual machine to enter a context of the virtual machine.

18. The method of claim 17, wherein the first encryption key identifier is associated with a first application set and the second encryption key identifier is associated with a second application set.

19. The method of claim 18, wherein the encryption key identifier identifies an encryption key stored within a secure encryption module, the encryption key being inaccessible to a host system that supports the virtual machine.

* * * * *